United States Patent
Dunn

[15] 3,680,838
[45] Aug. 1, 1972

[54] DIE BAR OR DIE BAR ATTACHMENT
[72] Inventor: Lynn D. Dunn, 1320 Peachtree Lane, Mount Prospect, Ill. 60056
[22] Filed: May 8, 1970
[21] Appl. No.: 35,851

[52] U.S. Cl. .....................254/131, 29/239, 29/267
[51] Int. Cl. ..............................................B66f 3/00
[58] Field of Search ........254/120, 131; 29/239, 267; 249/205, 207; 18/2 RM; 16/30, 42, 43, 45; 74/519, 523

[56] References Cited
UNITED STATES PATENTS

| | | |
|---|---|---|
| 173,228 | 2/1876 | McKenna.................29/267 UX |
| 555,578 | 3/1896 | Marden.........................16/43 X |
| 1,186,799 | 6/1916 | Kistler..........................254/131 |
| 2,774,609 | 12/1956 | Winger........................16/30 X |

FOREIGN PATENTS OR APPLICATIONS 105,428  4/1917  Great Britain.................254/131

Primary Examiner—Othell M. Simpson
Attorney—Alter, Weiss & Whitesel

[57] ABSTRACT

The invention provides a die bar or a thimble-like tip attachment for a die bar of a type used for opening die sets. The die bar or attachment includes a roller (preferably nylon, or the equivalent) which enables the tool to roll along the die set.

9 Claims, 9 Drawing Figures

PATENTED AUG 1 1972 3,680,838
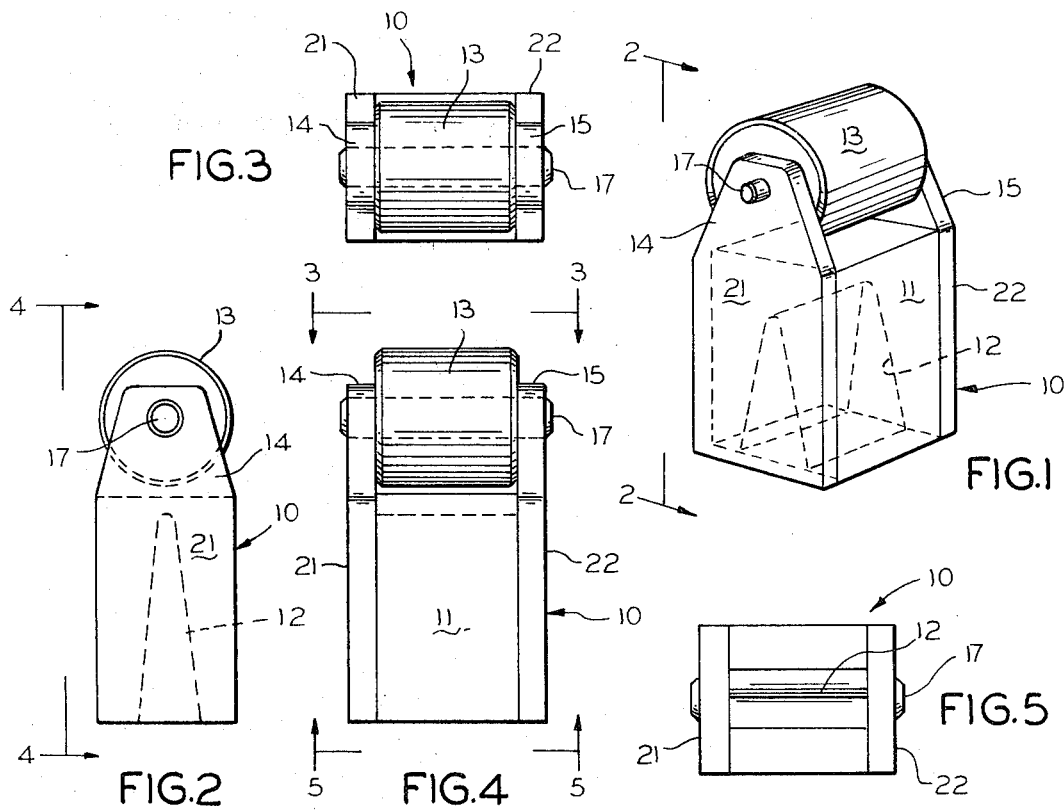
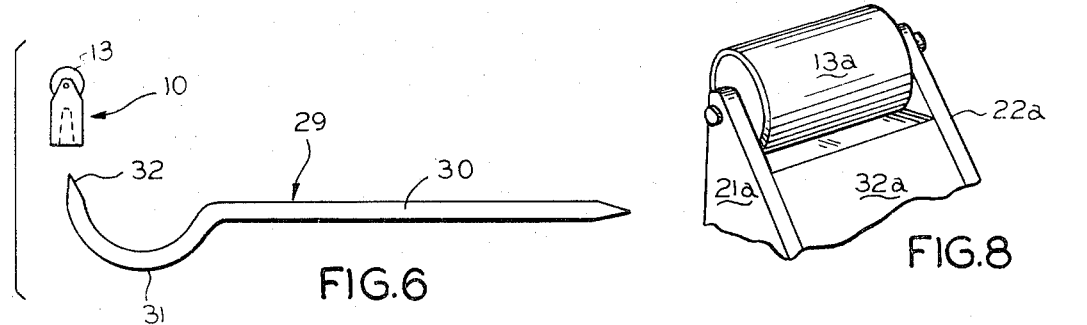
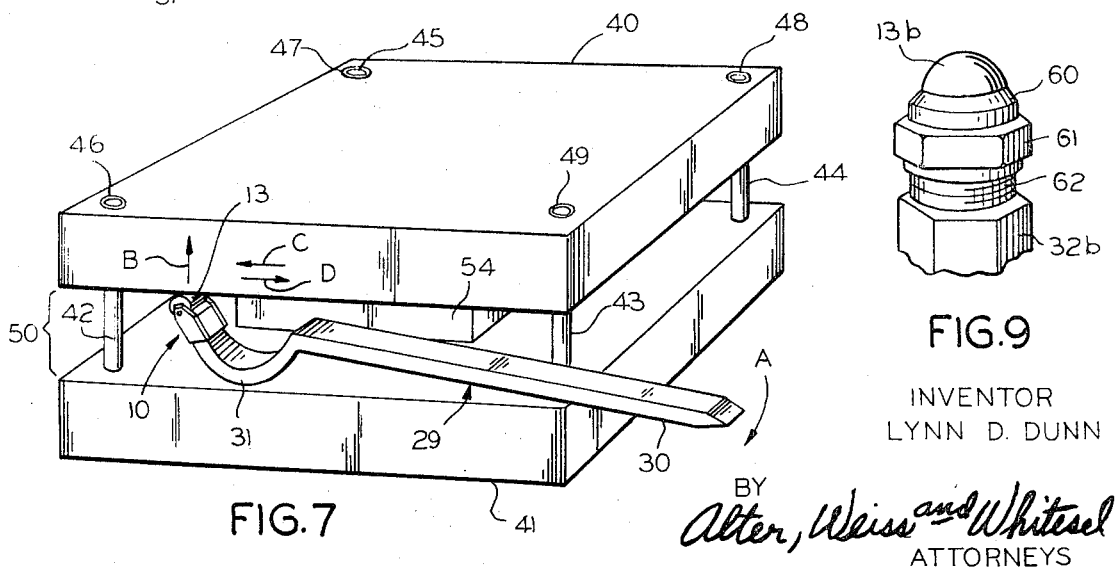
INVENTOR
LYNN D. DUNN
BY Alter, Weiss and Whitesel
ATTORNEYS

DIE BAR OR DIE BAR ATTACHMENT

This invention relates to die bars and more particularly to die bars or attachments for die bars which facilitate a manipulation of the die sets.

Those who are familiar with the tool and die makers tools will readily recognize the meaning of the term "die bar." This is a tool used by a tool and die maker to pry apart mated parts of die sets. More particularly, a die bar looks somewhat like a crowbar with a sharp bend immediately after the hook portion, thus giving a somewhat spoon shaped cross section. The tip end of the die bar is placed against one side of a die set and the bowl of the hook rests against the other side of the die set. When the handle is manipulated, the top of the die set is worked free of the bottom.

There are many difficulties which are encountered when die bars are used. Among other things, the tip of the bar mars the die set, and thereafter the surface of the die set has an unacceptable appearance which tends to reflect adversely upon the tool makers competance. To avoid such marring, the present practice is to coat the tip of the die bar with a soft metal, such as solder or a brazing material. However, this is a relatively expensive process since the solder wears off quickly and must be replaced often.

There are a number of additional problems which either result from or occur simultaneously with the use of die bars. For example, a tool and die maker must assure a perfect alignment of die blocks as they are mounted in a die set. In part, he checks the alignment by listening for squeaks or pings while he moves the die set from a closed to an open position. If the tip of the die bar scratches on the surface of the die set, there is a noise which conceals and simulates any noise resulting from a mis-alignment. This noise adds to the time required to make the alignment. Also, it may even contribute to mis-alignments. Still another problem results if the die bar cocks the die set while it is being opened. Then instead of a smooth sliding action, there is a rubbing action. Those who are skilled in this art will readily perceive still other problems relating to the use of die bars.

In keeping with an aspect of the invention, these and other objects are accomplished by providing a die bar or a thimble cap or attachment which fits over the end of a die bar. More particularly, insofar as the attachment is concerned, the invention provides a metal or other block having a cavity therein for receiving the end of the die bar. The other end of the block has a roller which rolls against the upper part of the die set to apply prying forces without marring the surface of the die set. Preferably, the roller is a material, such as nylon. The advantages of the nylon roller are first, that it is soft enough not to mar the die set and second, it is elastic enough not to develop a flat surface which would prevent the rolling action.

The nature of the inventive die bar or thimble attachment will become more apparent from a study of the attached drawing, in which:

FIG. 1 is a perspective view of an inventive thimble attachment;

FIG. 2 is a side elevation view of the thimble attachment taken along line 2—2 of FIG. 1;

FIG. 3 is a top plan view of the thimble attachment taken along line 3—3 of FIG. 1;

FIG. 4 is a front elevation view of the thimble attachment taken along the line 4—4 of FIG. 2;

FIG. 5 is a bottom view of the thimble attachment taken along line 5—5 of FIG. 4;

FIG. 6 is a side view of a die bar with a thimble attachment shown removed from the tip end of the die bar;

FIG. 7 is a perspective view of a die set with a die bar having an inventive thimble thereon;

FIG. 8 shows an alternative embodiment with the roller mounted directly on the tip end of the die bar; and FIG. 9 is a perspective view which shows a ball bearing attached to the end of a hexagonal die bar 32b.

The inventive thimble attachment 10 comprises a body or block 11 having a cavity 12 therein and a roller 13 mounted thereon. The block has a pair of upstanding arms 14, 15 thereon, spaced apart by a distance which is slightly more than the length of the roller 13. An axle 17 or a pair of trunnions rotatably support the roller so that it may turn freely about pivot points on the arms 14, 15. The cavity 12 has a cross section with an inverted V-shape with contours and dimensions which conform to and complement the contours and dimensions on the tip end of the die bar. Thus, the block 10 fits thimble fashion over the end of a die bar.

There are a number of different ways to make the inventive thimble attachment. For example, the block 11 could be a die casting. The arms 14, 15 could be integral parts of plates 21, 22 which may be bolted or otherwise attached over the ends of the block 11.

Preferably the roller 13 is made of a tough, but slightly flexible, material such as nylon. If the roller is made of steel or other material approximately as hard as the die set, it would be possible to mar or scratch the surface of the die set. Also, if the material is relatively unyielding, such as steel, flat surfaces might be formed on the roller, and it might not thereafter roll. Hence, a material such as nylon solves many problems. It is tough enough to withstand severe usage, it is soft enough not to scratch, and it has an elasticity with a memory which prevents any deformation.

FIG. 6 shows a die bar 29 having a handle 30, somewhat bowl shaped crook 31, and a tip 32. The thimble attachment 10 fits snugly over the tip 32 to form a single tool with roller 13 at the tip end. The roller 13 turns about an axis which is perpendicular to the handle 30.

FIG. 7 shows a die set with the die bar being used in the intended manner. More particularly, the die set comprises an upper or punch holder section 40 and a lower die set section 41 spaced and supported with respect to each other by any suitable number of leader pins. The drawing shows four such leader pins 42–45 which fit through bushings 46–49. These bushings could also be ball bearing supports. When the die set is closed, the two parts 40, 41 are separated by a shut height 50.

These two die set parts carry and support a pair of die blocks 54. As the punch holder 40 moves up or down on the leader pins 42–45, the die blocks move relative to each other. The alignment of these die blocks must be perfect, or the tool and die operation will not be successful. Therefore, there is a need for slowly moving the punch holder 40 up and down while making suitable adjustments at the bushings or bearings 46–49 associated with the leader pins 42–45.

To move the die set 40, 41 between its opened and closed positions, the die bar 29 is placed within the shut height 50 between the upper or punch holder section 40 and the lower section 41. The bowl 31 of the die bar rests on one die set section (the lower section 41), and the tip attachment 10 rests against the upper die set section 40. As the handle 30 is pressed downwardly in the direction A, the die bar rocks on the bowl part 31, and the tip 10 moves upwardly, in direction B.

During this upward movement, the roller 13 rolls freely along the lower surface of the upper die set member 40. The nylon roller is very quiet and can not be heard as it rolls along. No lateral forces can be created in either of the directions C or D. A first advantage is that the die bar does not create any sounds. Any rubbing or scraping noise results from a misalignment of the die set. A second advantage is that it is not possible to cock one half of the die set with respect to the other half. Those who are skilled in the art will readily perceive other advantages of the invention.

It should be apparent that many alternative structures may be made without departing from the spirit and scope of the invention. In greater detail, FIG. 8 shows that the roller 13a may be attached directly to the tip end of the pry bar 32a, without requiring any attachment. The roller is here shown as being attached to the end of the die bar by the plates 21a, 22a. It should also be apparent that various sizes and shapes may also be adopted for either the thimble attachments or the die bars. Furthermore, other rolling means, such as a ball bearing 13b, may be attached to the end of the die bar, 32b, as shown in FIG. 9. Here the bearing 13b is shown as being held in place by an annular collar 60 which is drawn down over the end of the die bar 32b by means of a threaded nut 61. By way of example, the tip end 32b of the die bar is here shown as a hexagonal bar which is threaded at 62. Also, alternative bearings may support the roller trunnions.

Accordingly, the appended claims are to be construed as covering all equivalents falling within the true scope and spirit of the invention.

I claim:

1. A thimble-like attachment for the end of a die bar, said attachment comprising a body having a V-shaped cavity therein, said cavity having a contour and dimension which complements the contour and dimension of the tip end of said die bar, and a rolling means on the end of said attachment.

2. The thimble-like attachment of claim 1 wherein said rolling means is a ball bearing.

3. The thimble-like attachment of claim 1 wherein said rolling means is a roller supported by said body on an axis which is perpendicular to the axis in which said die bar moves while it is working.

4. The thimble-like attachment of claim 3 and a pair of end plates on opposite sides of said body for supporting trunnions formed on said roller.

5. The thimble-like attachment of claim 4 wherein said roller is a nylon roller.

6. The thimble-like attachment of claim 3 wherein said roller is made from a tough material which is softer than steel and which has a memory that prevents any normal deformation.

7. The thimble-like attachment of claim 3 wherein the roller is close to the tip of the V of the cavity and its axis is at all points substantially in alignment with the center line of the V.

8. The combination of a die bar having an offset portion near one end which is V-shaped in cross section with a transversely extending tip, and a readily removable thimble-like attachment for that end,
said attachment comprising a body having a cavity therein,
said cavity having a contour and dimension which complements the contour and dimension of the tip end of said die bar, and
a rolling means on the end of said attachment.

9. The combination of a die bar having an offset portion near one end which is V-shaped in cross section with a transversely extending tip, and a readily removable thimble-like attachment for that end,
said attachment comprising a body having a cavity therein,
said cavity having a contour and dimension which complements the contour and dimension of the tip end of said die bar, and
a roller on the end of said attachment positioned close to said tip and approximately aligned with the center of the V, and rotatable about an axis parallel to said tip.

* * * * *